United States Patent Office 3,495,880
Patented Feb. 17, 1970

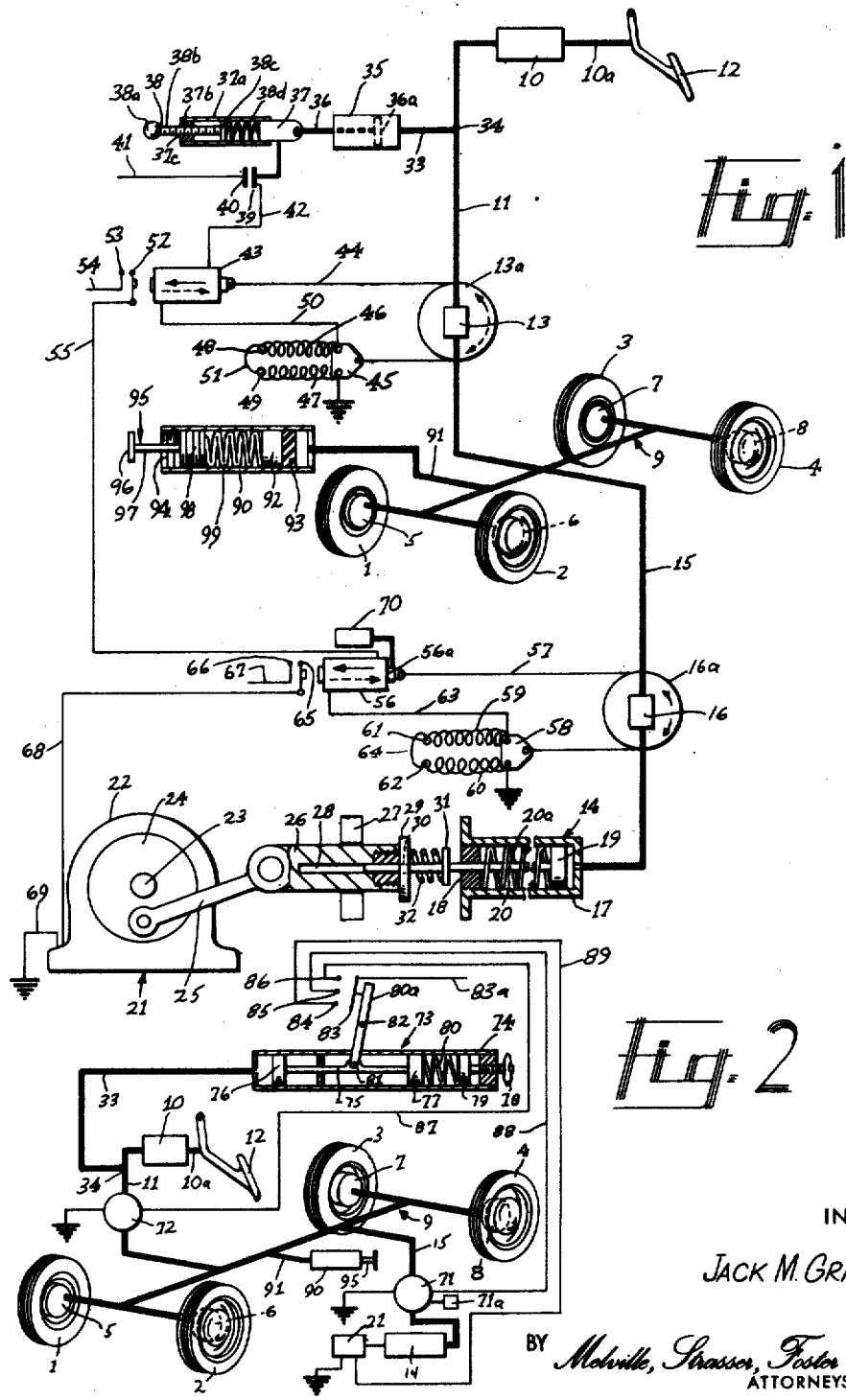

3,495,880
VEHICLE BRAKE SYSTEM
Jack M. Gratsch, 6720 Britton Ave.,
Cincinnati, Ohio 45227
Filed Jan. 25, 1968, Ser. No. 700,425
Int. Cl. B60f 8/06
U.S. Cl. 303—21                                13 Claims

ABSTRACT OF THE DISCLOSURE

In a conventional vehicle brake system comprising hydraulically actuated means for applying a braking action to the vehicle wheels, a master cylinder and means for forcing brake fluid under pressure from the master cylinder to the braking means at the vehicle wheels, means for preventing the vehicle wheels from locking comprising a pressure responsive means acting at a threshold pressure at which the vehicle wheels would lock to actuate a first valve means to isolate the brake system from the master cylinder. Thereafter a second valve means will be actuated to connect a pump means to the brake system. Finally pump operating means will be actuated whereby the pressure in the isolated brake system will be intermittently relieved to allow the vehicle wheels to rotate slowly. When the pressure at the pressure responsive means returns to a value below the threshold pressure, the pressure responsive means will act to cause the first valve to open and connect the master cylinder to the brake system. Thereafter the pump operating means will be deactivated and the second valve will be closed to disconnect the pump from the brake system.

BACKGROUND OF THE INVENTION

Field of invention

The invention relates to a vehicle brake system, and more particularly to a hydraulic vehicle brake system having means for preventing the vehicle wheels from locking.

Description of the prior art

It has long been recognized that one of the primary dangers encountered while driving a vehicle on slippery road surfaces is the tendency of the vehicle wheels to lock upon sudden or hard application of the vehicle brakes. Locking of the vehicle wheels generally lasts for the duration of the application of the brakes and results in skidding with consequent loss of control of the vehicle both with respect to speed and direction.

Heretofore, prior art workers have developed a number of devices for preventing the locking of vehicle wheels, but the prior art devices have been characterized by complex structure, a plurality of specialized parts and expensive construction and installation.

The present invention is directed to means, applicable to an otherwise conventional vehicle braking system, which will prevent locking of the vehicle wheels for the duration of the application of the vehicle brakes and which will provide intermittent relief of pressure in the brake system to allow the wheels to roll slowly. The means of the present invention are easy and inexpensive to manufacture and install, are independent of the vehicle motor and are simple in construction.

SUMMARY OF THE INVENTION

In a conventional hydraulic vehicle brake system, a master cylinder is connected through brake lines to braking means at the vehicle wheels. The braking means may be of the disc-type or the shoe-drum type. When the vehicle operator depresses the brake pedal, pressure generated in the brake fluid in the master cylinder is transmitted through the brake lines to the braking means at the vehicle wheels. The present invention contemplates the provision of a first valve means by which the vehicle brake system may be isolated from the master cylinder. The invention further contemplates the provision of a pump and pump operating means which may be connected to the brake system through second valve means. A pressure responsive means is so located in the system that when the brake fluid pressure required to lock the wheels under given road conditions (hereinafter called the threshold pressure) is reached, the pressure responsive means will cause the normally open first valve to close, thereby isolating the brake system from the master cylinder. Thereafter the normally closed second valve will open, thereby connecting the pump means to the system, and the pump operating means will begin to function. Actuation of the pump will result in intermittent relief of pressure in the brake line and thus will allow the vehicle wheels to rotate slowly.

Upon return of the brake fluid pressure to a value below the threshold pressure, the pressure responsive means will deactivate the pump, close the second valve means and reopen the first valve means. Under these circumstances, the vehicle brake system will function normally until such time as the threshold pressure is again attained.

BRIEF DESCRIPTION OF THE DRAWINGS

FIG. 1 is a semi-diagrammatic representation, partly in cross section, of one embodiment of the present invention.

FIG. 2 is a semi-diagrammatic representation, partly in cross section, of a second embodiment of the present invention.

DESCRIPTION OF THE PREFERRED EMBODIMENTS

FIG. 1 is a semi-diagrammatic representation of one embodiment of the present invention. For purposes of an exemplary illustration, the brake system of the present invention is shown as applied to a four-wheeled vehicle such as an automobile or truck. The vehicle wheels are shown at 1–4. Each of the wheels 1–4 is provided with a braking means diagrammatically indicated at 5–8 respectively. The braking means may be of any well known type such as the disc-type or the brake drum-shoe type. The braking means 5–8 are diagrammatically shown as interconnected by a series of brake lines generally indicated at 9. The braking means 5–8 and the brake line system 9 constitute what may be termed the master brake system.

A master cylinder 10 is connected to the master brake system through line 11. The master cylinder 10 contains a piston (not shown) having a piston rod 10a which is appropriately affixed to actuating means such as a brake pedal 12.

The line 11 contains a valve 13. The valve 13 may be of any suitable type. For purposes of an exemplary showing, the valve 13 is illustrated as provided with a valve wheel 13a, so arranged that counterclockwise rotation of the valve wheel will cause the valve 13 to close, while clockwise rotation of the valve wheel will cause the valve 13 to open.

A pump means, generally indicated at 14, is connected to the master system through line 15. Line 15 contains a valve 16, which may be similar to valve 13, but which will open when valve wheel 16a is turned in a counterclockwise direction and will close when valve wheel 16a is turned in a clockwise direction.

The pump 14 comprises a cylinder 17, the closed end of which is connected to the line 15. The open end of the cylinder 17 is closed by the threaded fitting 18. The cylinder contains a piston 19 having a piston rod 20. The piston rod 20 is surrounded by a spring 20a extending between the fitting 18 and the piston 19, and tending to urge the piston toward that end of the cylinder connected to the line 15.

A pump actuating means is generally indicated at 21. The precise nature of the actuating means does not constitute a limitation on the present invention. For purposes of an exemplary showing, the actuating means is illustrated as comprising an electric motor 22 having a shaft 23 on which is mounted a drive wheel 24. A connecting rod 25 is pivotally affixed at one end to the drive wheel 24 and is pivotally affixed at its other end to the element 26. Rotation of the drive wheel 24 will, through the action of the connecting rod 25, cause the element 26 to reciprocate in the guide means 27.

The element 26 has a central perforation 28 adapted to slidably receive the free end of the piston rod 20. A fitting 29 is threadably engaged in the end of the element 26 and contains a perforation 30, which is coaxial with and of the same diameter as the perforation 28.

The piston rod 20 has a disc 31 non-slidably affixed thereto, as by pinning or the like. A spring 32 is located about piston rod 20 and may be "floating" thereon or affixed at one end only, either to the fitting 29 or to the disc 31. Thus, reciprocation of the element 26 will be imparted to the piston rod 20 and piston 19 through the spring 32.

A branch conduit 33 is connected to the line 11 as at 34. The conduit 33 leads to a cylinder 35 containing a piston rod 36 and a piston 36a. The piston rod 36 is connected to a plunger element 37 slidable within a cylinder 37a having an end closure member 37b with a central threaded perforation 37c. A manual adjustment means 38 comprises a handle 38a and a threaded shaft 38b, terminating in a disc 38c. The shaft 38b is threadedly engaged in the perforation 37c. A spring 38d is located within the cylinder 37a between the plunger element 37 and the disc 38c. The plunger element 37 carries a switch contact 39. The arrangement is such that movement of piston rod 36 to the left in FIG. 1 will result in movement of plunger element 37 to the left against spring 38d, causing switch contact 39 to close against switch contact 40. The amount of pressure required to close switch contacts 39 and 40 may be manually determined by the degree to which adjustment means 38 is threaded into cylinder 37a.

The switch contact 40 is connected by lead 41 to a source of current. The switch contact 39 is connected by a lead 42 to the coil of a solenoid 43.

The solenoid 43 has a core element 43a. The solenoid core 43a has affixed thereto a cable 44 which passes around the valve wheel 13a and is connected to an insulative element 45. A pair of springs 46 and 47 are connected at one end to the insulative element 45 and at the other end to anchor means 48 and 49. The anchor means 48 and 49 may be affixed to a bracket or other suitable mounting means (not shown).

When the switch contacts 39 and 40 are closed by the action of the piston rod 36 and plunger 37, the solenoid 43 will be energized. The solenoid coil is connected to ground through lead 50, spring 46, lead 51 and spring 47. Thus, should either of the springs 46 and 47 break, the electrical connection to the solenoid 43 will be broken. Energization of the solenoid 43 will cause the core 43a to move to the left in FIG. 1. The cable 44 will be pulled against the action of the springs 46 and 47 and will cause the valve wheel 13a to turn in a counterclockwise direction to close the valve 13. When the solenoid 43 is de-enerigzed, the springs 46 and 47, through the agency of the cable 44, will cause the valve wheel 13a to turn in a clockwise direction, opening the valve 13.

When the solenoid 43 is energized, the core 43a will cause the closing of switch contacts 52 and 53. Contact 53 is connected by lead 54 to a source of electric current, and contact 52 is connected by lead 55 to the coil of a second solenoid 56.

The arrangement of the solenoid 56 is similar to the solenoid 43. Solenoid 56 has a core 56a to which a cable 57 is attached. The cable 57 extends about valve wheel 16a and is connected to the insulative means 58. A pair of springs 59 and 60 are connected to the insulative means 58 at one end and to anchor means 61 and 62 at the other end. The coil of the solenoid 56 is connected to ground through lead 63, spring 59, lead 64 and spring 60.

Energization of the solenoid 56 will cause the core 56a to move to the left in FIG. 1 and will, by means of cable 57 cause the valve wheel 16a to move in a counterclockwise direction, opening valve 16. De-energization of the solenoid 56 will, through the agency of cable 57 and springs 59 and 60, cause the valve wheel 16a to move in a clockwise direction, closing valve 16.

When the solenoid 56 is energized, leftward movement of the core 56a will cause the closing of switch contacts 65 and 66. Switch contact 66 is connected through lead 67 to a source of electrical power, while switch contact 65 is connected through lead 68 to the motor 22. The motor 22 is, in turn, connected to ground by lead 69.

The core 56a of the solenoid 56 is connected to dampening means 70 which may be of any suitable type such as the piston-cylinder type. The action of the dampening means 70 will retard movement of the core 56a to the right and hence will insure that the piston 19 will purge cylinder 17 of fluid prior to the closing of valve 16. It will again be evident that should either or both of the springs 59 and 60 fail, the solenoid 56 will be de-energized.

The operation of the embodiment of FIG. 1 is as follows. Since the valve 13 is normally open and the valve 16 is normally closed, depression of the brake pedal 12 will, under normal circumstances, build up a pressure in the brake fluid in master cylinder 10, which pressure will be transmitted through line 11 to the master system 9 and hence to the braking means 5–8 at the vehicle wheels 1–4 respectively.

The piston 36a and piston rod 36 in the cylinder 35 are so regulated by adjustment means 38 as to cause the plunger 38 to close switch contacts 39 and 40 when the pressure in the master cylinder has reached the above described threshold value. When the threshold value is attained, contacts 39 and 40 will be closed and solenoid 43 will be energized. As described above, energization of solenoid 43 will cause the closing of valve 13 and thereafter the closing of switch contacts 52 and 53. The closing of switch contacts 52 and 53 will, in turn, cause the energization of solenoid 56.

As described above, energization of solenoid 56 will cause the opening of valve 16 and thereafter the closing of switch contacts 65 and 66 which, in turn, will energize the motor 22 causing reciprocation of the pump means 14.

As will be evident from FIG. 1, once the master system 9 has been isolated from the master cylinder by the valve 13, the pressure in the master system 9 will be relieved and reapplied by the reciprocation of the piston 19 in the cylinder 17. This intermittent relieving of the pressure in the master system 9 will permit the wheels 1–4 to roll slowly and will prevent them from locking permanently.

When the pressure in the master cylinder returns to a value less than the threshold pressure, the piston 36a, piston rod 36 and plunger 37 will move to the right in FIG. 1. This, in turn, will cause the opening of switch contacts 39 and 40 and the deactivation of solenoid 43. As described above, deactivation of solenoid 43 will result in the opening of switch contacts 52 and 53, and in the opening of valve 13. The opening of contacts 52 and 53 will cause the deactivation of solenoid 56. This, in turn, will result in the opening of switch contacts 65 and 66 and the closing of valve 16. When switch contacts 65 and 66 are opened, the motor 22 will be de-energized. As indicated above, dampening means 70 will retard the closing of valve 16 sufficiently to first enable piston 19 to purge cylinder 17 of fluid. This sequence of events will return the brake system to normal, and the normal braking action as described above will take place unless and until the threshold pressure is again attained in the master cylinder.

It is within the scope of the present invention to provide a cushioning or relief means in the master system 9 to compensate for any undue or unexpected pressure build-up in the master system. The pressure within the master system should not, at any time, exceed the threshold pressure.

The cushioning or relief means comprises a cylinder 90 having a closed end connected to the master system 9 by line 91. The cylinder contains a piston 92 provided with a resilient sealing cup 93 of rubber or the like. The open end of the cylinder 90 is provided with internal threads as at 94.

A manual adjustment means, generally indicated at 95, comprises a handle 96 affixed to a shaft 97. A disc 98 is affixed to the shaft 97 and is provided with external threads adapted to cooperate with the threads 94 on the cylinder 90. A spring 99 extends between the disc 98 and the piston 92. Adjustment of the depth to which the means 95 is threaded into the cylinder 90 will determine the amount of pressure required to move the piston 92 and sealing cup 93 to the left in FIG. 1. The cushioning means should be so adjusted (with respect to the threshold pressure) as to permit relief in the master system 9 of pressures in excess of the threshold pressure.

FIG. 2 illustrates a second embodiment of the present invention. Like parts have been given like index numerals. Again, the vehicle wheels 1–4 are provided with braking means 5–8 respectively, interconnected by a brake line system comprising the master brake system generally designated by the index numeral 9. A pump means 14 is connected to the master system 9 by line 15. In this instance, however, the line 15 contains a solenoid valve 71 serving substantially the same purpose as the valve 16 in FIG. 1.

The pump means 14 is provided with a suitable actuating means 21. The pump means 14 and actuating means 21 may be similar to that described with respect to FIG. 1.

A master cylinder 10 is connected to the master system 9 by line 11. As described with respect to FIG. 1, the master cylinder will contain a piston having a piston rod 10a connected to actuating means such as a brake pedal 12. The line 11 contains a solenoid valve 72 serving substantially the same function as the valve 13 in FIG. 1.

In this embodiment, the pressure responsive means, generally indicated at 73, is connected by line 33 to line 11 at 34. In this instance, the pressure responsive means comprises a cylinder 74. The line 33 is connected to one end of the cylinder. The cylinder contains a piston rod 75 having a piston 76 at one end and a disc-shaped element 77 at the other end. An adjustable screw 78 extends through an end of the cylinder 74. That end of the screw 78 which extends into the cylinder is provided with a disc-shaped element 79. A spring 80 is located between the disc elements 77 and 79.

The pressure responsive means 73 is adapted to operate a switch means when the threshold pressure is attained in the master cylinder 10 and communicated to the pressure responsive means via lines 11 and 33. The nature of the switch means does not constitute a limitation on the present invention. For purposes of an exemplary showing, a lever 80a is illustrated as being pivotally affixed to the piston rod 75 at 81. The lever 80a extends through a slot in the cylinder 74 and is pivotally mounted at 82 to a suitable mounting or bracket means (not shown). The free end of the lever 80a carries a contact means 83 connected by a lead 83a to a source of electrical energy. As will be evident from FIG. 2, if the piston 76 and piston rod 75 are caused to move to the right, the lever 80a will pivot in such a way as to close the contact 83 against contacts 84, 85 and 86. Contact 86 is connected by lead 87 to the solenoid valve 72. Contact 85 is connected by lead 88 to solenoid valve 71 and contact 84 is connected by lead 89 to the pump actuating means 21. A relief cylinder 90 and manual adjustment means 95, similar to that described with respect to FIG. 1, may be connected to the master system 9 by line 91. Again valve 71 may be provided with means (generally indicated at 71a) for retarding its closing until pump means 14 is purged of fluid.

The operation of the embodiment of FIG. 2 is substantially the same as the operation of the embodiment of FIG. 1. Solenoid valve 72 is normally open, and solenoid valve 71 is normally closed. Under usual driving conditions, depression of brake pedal 12 will result in the generation of pressure in the brake fluid in master cylinder 10, which pressure will be communicated via line 11 to the master system 9, and hence to the braking means 5–8. When the threshold pressure is reached in the master cylinder, and communicated via lines 11 and 33 to the pressure responsive means 73, the piston 76 and piston rod 75 will be caused to move to the right in FIG. 2 against the action of the spring 80. This, in turn, will cause a pivoting of the lever 80a and a closing of the contact 83 against the contacts 84, 85 and 86. As a result, the solenoid valve 72 will be closed isolating the master system from the master cylinder, and the solenoid valve 71 will be opened and the pump actuating means 21 will be energized. Consequently, the pressure in the master system 9 will be intermittently relieved by the pump means 14 in a manner similar to that described with respect to the embodiment of FIG. 1.

When the pressure in the master cylinder reaches a value below the threshold pressure, the spring 80 will cause the piston 76 and piston rod 75 to move to the left in FIG. 2, resulting in the movement of contact 83 away from contacts 84, 85 and 86. When contact 83 is moved away from contacts 84, 85 and 86, the solenoid valve 72 will open, the pump actuating means 21 will be deactivated, and the solenoid valve 71 will close. The braking system will then function normally unless and until the threshold pressure is again attained in the master cylinder 10.

Through the agency of spring 80, adjustment of the screw 78 will determine the pressure at which the pressure responsive means 73 will cause contact 83 to close against contacts 84, 85 and 86. In this way, the threshold pressure at which the means 73 will respond can be adjusted to meet given conditions of the road surface and the like.

The switch means, actuated by the pressure responsive means 73, should be of the sequential type, so that the various elements will be actuated and deactivated in the proper sequence indicated above.

Modifications may be made in the invention without departing from the spirit of it. For example, the pump and pump actuating means described above with respect to the embodiments of FIGS. 1 and 2, can be replaced by a solenoid-timing device combination serving the same purpose.

It will be understood by one skilled in the art that the various operating instrumentalities described above will be suitably affixed to or supported by appropriate parts of the vehicle body, frame and the like. The figures are diagrammatic in nature and support means have been omitted for purposes of clarity.

The embodiments of the invention in which an exclusive property or privilege is claimed are defined as follows:

1. In a conventional brake system comprising hydraulically actuated braking means at the vehicle wheels, a system of brake lines to said braking means, a master cylinder, a master cylinder line connecting said master cylinder to said system of brake lines and means for forcing brake fluid from said master cylinder through said master cylinder line and said system of lines to said braking means, the improvement comprising means for preventing the vehicle wheels from locking, said last mentioned means comprising a first normally open valve in said master cylinder line, a pump and pump operating means, a pump line connecting said pump to said system of brake lines, a second normally closed valve in said pump line, and a pressure responsive means connected to said master cylinder line between said master cylinder and said first valve, said pressure responsive means being adjustable to respond when a threshold pressure at which the vehicle wheels would lock is reached in said master cylinder line, said pressure responsive means being operatively connected to said first valve, said second valve and said pump operating means, whereby when said threshold pressure is reached in said master cylinder line, said pressure responsive means will first cause said first valve to close isolating said brake line system from said master cylinder, will then cause said second valve to open connecting said pump to said system, and will thereafter actuate said pump operating means so that the pressure in said isolated system will be intermittently relieved by said pump to allow said vehicle wheels to rotate slowly, and whereby when the pressure in said master cylinder line returns to a value below said threshold value said pressure responsive means will first open said first valve connecting said master cylinder to said brake line system, will then deactivate said pump operating means and will finally close said second valve disconnecting said pump from said brake line system.

2. The structure claimed in claim 1, including a source of electrical energy, said first valve having a valve wheel, said first valve wheel being rotatable between a valve open and a valve closed position by first cable means passing thereabout, a first spring means, one end of said first spring means being anchored, the other end of said first spring means being attached to one end of said first cable means whereby to urge said first valve wheel to said valve open position, a first solenoid having a core, the other end of said first cable means being affixed to said first solenoid core whereby to rotate said first valve wheel to said valve closed position when said first solenoid is energized, said second valve having a valve wheel, said second valve wheel being rotatable between a valve closed and a valve open position by second cable means passing thereabout, a second spring means, one end of said second spring means being anchored, the other end of said second spring means being attached to one end of said second cable means whereby to urge said second valve wheel to said valve closed position, a second solenoid having a core, the other end of said second cable means being affixed to said second solenoid core whereby to rotate said second valve wheel to said valve open position when said second solenoid is energized, said pump operating means comprising an electrically actuated means, a first switch, said switch connecting said first solenoid to said source of electrical energy, said switch being closable by said pressure responsive means when said threshold pressure is reached in said master cylinder line, a second switch, said second switch connecting said second solenoid to said source of electrical energy, said second switch being closable by said core of said first solenoid when said first solenoid is energized, a third switch, said third switch connecting said pump operating means to said source of electrical energy, said third switch being closable by said core of said second solenoid when said second solenoid is energized.

3. The structure claimed in claim 1 including pressure relief means connected to said system of brake lines, whereby to relieve pressure therein in excess of said threshold pressure.

4. The structure claimed in claim 1 including a source of electrical energy, said first valve being a solenoid valve of the type which closes when energized, said second valve being a solenoid valve of the type which opens when energized, said pump operating means being actuable by electrical energy, said pressure responsive means comprising a sequential switch means, said sequential switch means comprising a first contact means for connecting said first valve to said source of electrical energy, a second contact means for connecting said second valve to said source of electrical energy and a third contact means for connecting said pump operating means to said source of electrical energy.

5. The structure claimed in claim 1 including means for purging said pump of brake fluid when said pump operating means is deactivated and means in association with said second valve to retard the closing thereof to enable said purging of said pump.

6. The structure claimed in claim 2, wherein said pressure responsive means comprises a cylinder, the forward end of said cylinder being connected to said master cylinder line, a piston located in said cylinder, said piston having a pitson rod operatively connected to said first switch, means for urging said piston toward the forward end of said cylinder against the pressure of said brake fluid in said master cylinder line, said last mentioned means being adjustable whereby when said threshold pressure is reached in said master cylinder line said piston will move away from said forward end of said cylinder causing said first switch to close.

7. The structure claimed in claim 2 wherein said pump comprises a cylinder, said pump line communicating with the forward end of said cylinder, a piston and piston rod being located within said cylinder, said piston rod being operatively connected to said pump operating means, spring means so located in said cylinder as to urge said piston toward said forward end of said cylinder whereby to purge said cylinder of brake fluid when said pump operating means is deactivated, and means in association with said second valve to retard the closing thereof to enable said purging of said pump.

8. The structure claimed in claim 2 including pressure relief means connected to said system of brake lines, whereby to relieve pressure therein in excess of said threshold pressure.

9. The structure claimed in claim 2 wherein said pump operating means comprises an electric motor.

10. The structure claimed in claim 4 wherein said pressure responsive means comprises a cylinder, the forward end of said cylinder being connected to said master cylinder line, a piston located in said cylinder, said piston having a piston rod operatively connected to said sequential switch means, means for urging said piston toward the forward end of said cylinder against the pressure of the brake fluid in said master cylinder line, said last mentioned means being adjustable whereby when said threshold pressure is reached in said master cylinder line said piston will move away from said forward end of said cylinder causing said sequential switch to be actuated.

11. The structure claimed in claim 4 wherein said pump comprises a cylinder, said pump line communicating with the forward end of said cylinder, a piston and piston rod being located within said cylinder, said piston rod being operatively connected to said pump operating means, spring means so located in said cylinder as to urge said piston toward said forward end of said cylinder whereby to purge said cylinder of brake fluid when said pump operating means is deactivated, and means in association with said second valve to retard the closing thereof to enable said purging of said pump.

12. The structure claimed in claim 4 including pressure relief means connected to said system of brake lines, whereby to relieve pressure therein in excess of said threshold pressure.

13. The structure claimed in claim 4 wherein said pump operating means comprises an electric motor.

References Cited

UNITED STATES PATENTS

| | | | |
|---|---|---|---|
| 2,959,012 | 11/1960 | Johnson | 303—61 X |
| 3,276,822 | 10/1966 | Lister et al. | 303—21 X |
| 3,361,487 | 1/1968 | Vriend | 303—61 |
| 3,404,923 | 10/1968 | Smoren | 303—21 X |

MILTON BUCHLER, Primary Examiner

JOHN J. McLAUGHLIN, JR., Assistant Examiner

U.S. Cl. X.R.

188—181; 303—10, 61, 68